A. OLIER.
MIXING MACHINE FOR INDIA RUBBER AND SIMILAR COMPOSITIONS.
APPLICATION FILED NOV. 18, 1913.
1,100,768.
Patented June 23, 1914.
3 SHEETS—SHEET 1.
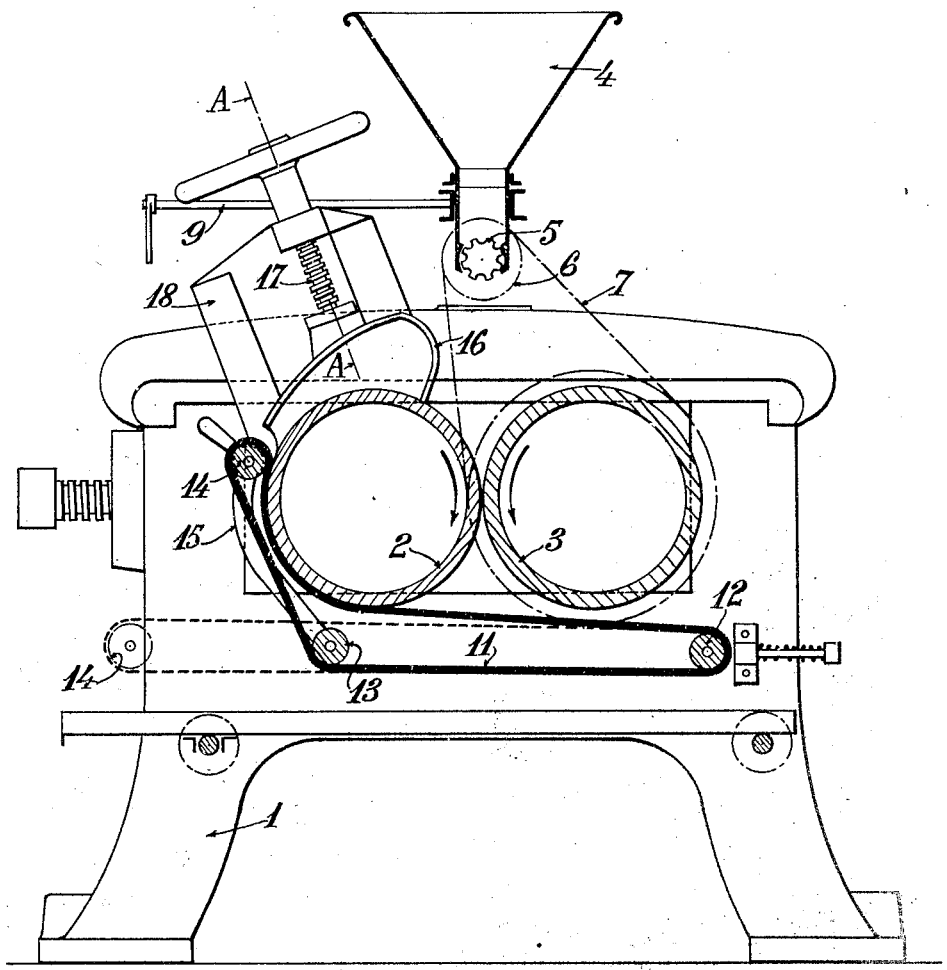
WITNESSES:
John C. Sanders
Albert F. Herman
INVENTOR:
André Olier
BY Wallace White
ATT'Y

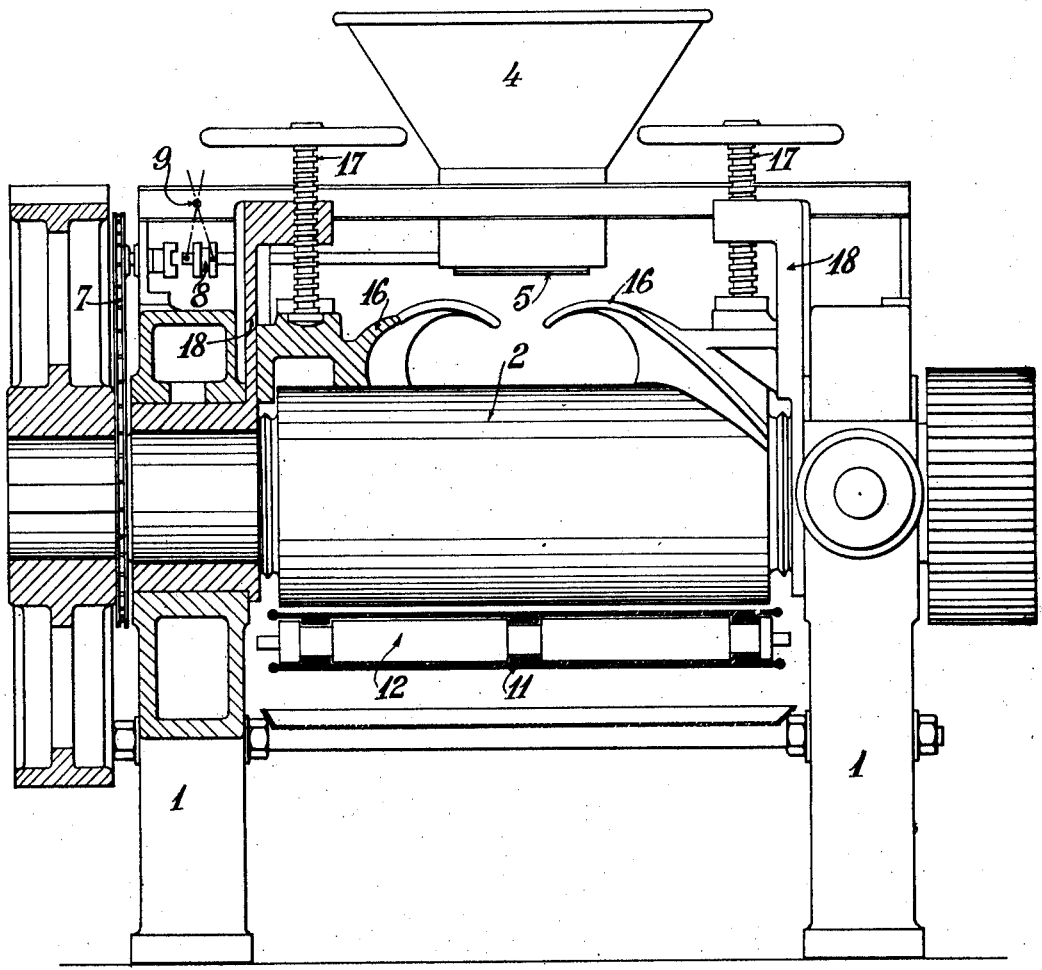

A. OLIER.
MIXING MACHINE FOR INDIA RUBBER AND SIMILAR COMPOSITIONS.
APPLICATION FILED NOV. 18, 1913.
1,100,768. Patented June 23, 1914.
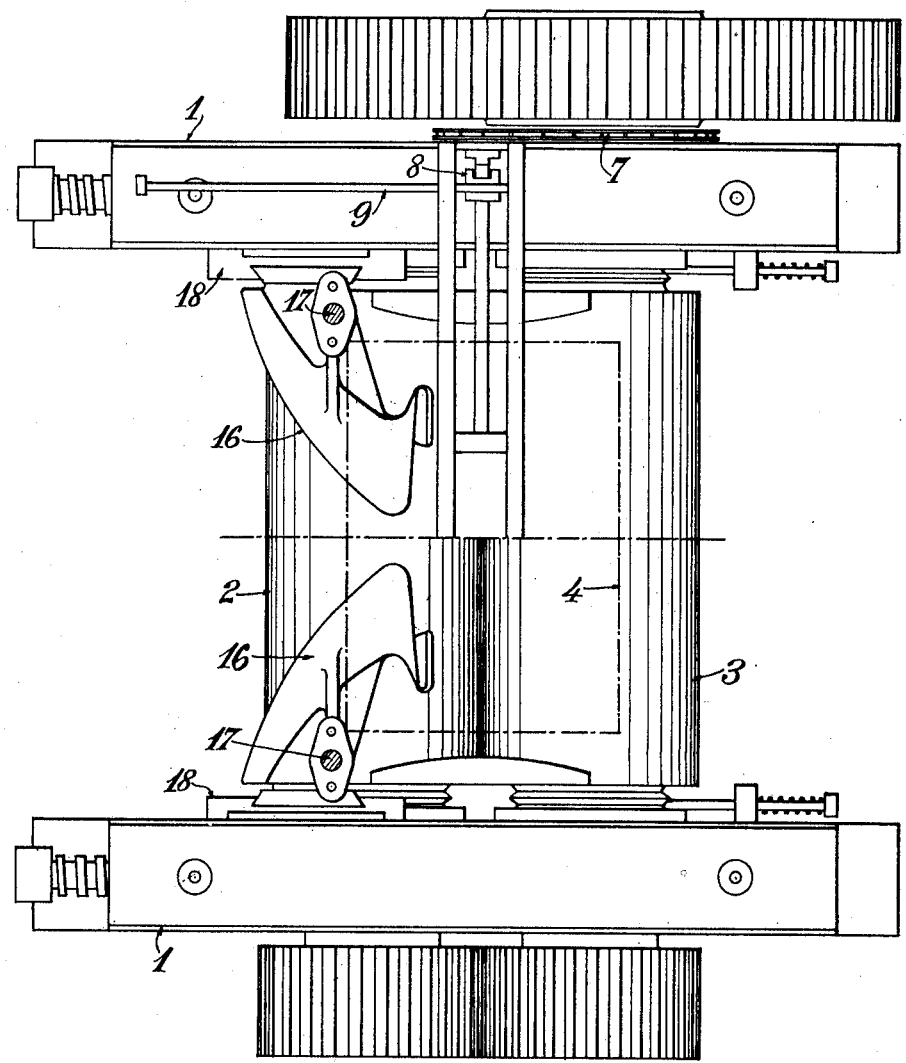

UNITED STATES PATENT OFFICE.

ANDRÉ OLIER, OF CLERMONT-FERRAND, FRANCE, ASSIGNOR TO SOCIÉTÉ A. OLIER & CIE., OF CLERMONT-FERRAND, FRANCE.

MIXING-MACHINE FOR INDIA-RUBBER AND SIMILAR COMPOSITIONS.

1,100,768.                Specification of Letters Patent.    Patented June 23, 1914.

Application filed November 18, 1913. Serial No. 801,578.

*To all whom it may concern:*

Be it known that I, ANDRÉ OLIER, citizen of the Republic of France, residing at Usines Saint-Remy, Clermont-Ferrand, Puy-de-Dôme, in the Republic of France, have invented new and useful Improvements in Mixing-Machines for India-Rubber and Similar Compositions, of which the following is a specification.

My invention relates to a mixing machine working automatically and particularly adapted for use in treating india rubber and similar plastic compositions.

My machine is of the type comprising a heated cylinder which rotates in contact with the periphery of another cylinder and upon which the rubber or other composition to be treated is carried in the form of a sleeve. A distributer is also provided to feed to the rubber the sulfur or other powders to be mixed therewith. Up to the present in this class of machines, the gum on the cylinder is turned over by hand from time to time by the operator so that fresh parts of the gum are brought to a position to receive the powder. This operation necessitates skill and labor and moreover it does not permit the obtaining of a homogeneous mixture; the overturning of the gum layer being made in a more or less irregular manner according to the attention or skill of the operator.

My invention permits of rendering the working of the mixing machine and particularly the overturning of the gum layer entirely automatic whereby labor is saved and a more homogeneous mixture is obtained.

In the annexed drawings given by way of example: Figure 1 is a cross section of a machine according to my invention, Fig. 2 is a front view, partly in section along A—A, Fig. 1, and some parts being omitted, Fig. 3 is a plan view.

In the drawings, 1 designates two side frames carrying two cylinders 2, 3, which rotate in the direction of the arrows under the action of any suitable driving means comprising for instance the toothed wheels shown. Above the cylinders is arranged a hopper 4 having a sufficient capacity to contain all the components of an india rubber composition with the exception of the rubber. At the bottom of the hopper, is located a cylindrical distributer 5 driven by a chain pinion 6 and a chain 7. The distributer has for its effect to continuously distribute the powders in the hopper, over the rubber treated which forms a sleeve around the cylinder 2, the latter being heated more intensely than the cylinder 3 in a known manner. A clutch 8 operated by means of a rod 9 (Fig. 1) is provided so that the distributer may be put in operation or stopped at will.

To receive and bring back to the cylinder 2 the particles of material which have passed through the interval between the cylinders, an endless apron 11 is carried upon rollers 12, 13, 14. The roller 14 is mounted upon two side arms 15 which can swing around the axis of the roller 13 whereby the roller 14 may be brought to the position shown in dotted lines. In the position in full lines, the apron 11 is in contact with the cylinder 2 and driven frictionally by the same so that all particles of material which have not been incorporated with the rubber sleeve and fall below the cylinders are drawn upwardly by the apron along the cylinder 2 to be carried again between the cylinders. In the position shown in dotted lines, the apron 11 is stopped the cylinder 2 is free and the operator may cut the rubber sleeve on the cylinder and remove it from the latter.

At the ends of the cylinder 2, are arranged two blades 16 in the form of plowshares adapted to come into contact with the cylinder so that the gum which forms a sleeve around the latter is continuously turned up by said blades, in the rotation of the cylinder and brought back to the cylinder periphery in an overturned condition so that fresh surfaces adapted to absorb the powders fed by the distributer are always presented to the same. By this uninterrupted overturning of the gum, effected mechanically, a thoroughly homogeneous mixture may be obtained very rapidly and without any manual assistance. The contact of the blades or plowshares 16 with the gum on the periphery of the cylinder 2 may be adjusted by means of screws 17 which extend through threaded brackets 18 secured to the bearing of the cylinder 2 and permit of raising or lowering the blades 16 as desired.

Having now described my invention, what I claim as new and desire to secure by Letters Patent is:

1. In a mixing machine: a cylinder, means for rotating said cylinder and a blade adapted to act as a plowshare on the sleeve formed on the cylinder periphery by the material to be treated, substantially as described and for the purpose set forth.

2. In a mixing machine, two cylinders, means for rotating said cylinders in opposite directions, a hopper above the cylinders, a distributer at the bottom of the hopper, means for rotating said distributer, rollers, an apron carried on said rollers and extending below the cylinders, means for engaging the apron into frictional contact with one of the cylinders or disengaging the apron from the same, blades adapted to act as plowshares on the sleeve formed on the periphery of said cylinder by the material to be treated, and means for displacing the blades to or from the cylinder, substantially as described and for the purpose set forth.

In testimony whereof I have signed my name to this specification in the presence of two subscribing witnesses.

ANDRÉ OLIER.

Witnesses:
   Louis Moses,
   Frank H. Mason.